UNITED STATES PATENT OFFICE.

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA.

FINISH-REMOVER.

1,160,394.  Specification of Letters Patent.  Patented Nov. 16, 1915.

No Drawing.   Application filed March 20, 1911.   Serial No. 615,711.

*To all whom it may concern:*

Be it known that I, CARLETON ELLIS, a citizen of the United States, and resident of Montclair, Essex county, New Jersey, have made certain new and useful Inventions Relating to Finish-Removers, of which the following is a specification.

This invention relates especially to finish removers comprising phenolic finish loosening material combined with alkaline palliative material which may be incorporated with volatile organic finish solvents.

Carbolic and cresylic acids and their higher homologues, guaiacol, beechwood tar acid and other acid bodies of similar character derived from wood, coal, etc., by destructive distillation, including creosotes derived from wood and coal tar, shale oil and blast furnace products such as neosote, etc., are sometimes desirable in removers that are used under extreme service conditions because of their energetic loosening action on many paints and finishes. These materials are, however, disadvantageous because of their caustic and corrosive action on the workmen and on finish surfaces to which they are applied under certain circumstances. By the use of suitable palliative material, however, such corrosive properties may be mitigated and neutralized without destroying the desirable loosening action on the finish and the remover rendered much more satisfactory in its action.

Carbolic acid may be combined with the desired quantity of inorganic alkaline material, such for example, as sodium or potassium hydrate, oxid of magnesia or organic alkaline or neutralizing material, such as anilin or methylamin. Even a small proportion of such palliative material seems to combine with the corrosive acid body so as to form complex compounds of a much less corrosive and injurious character. Instead of forming the alkali phenate in this way, the previously prepared alkali phenates, such as sodium, or potassium carbolate or cresylate may be used in connection with the volatile organic solvent material which may make up the bulk of the remover. Potassium phenate, for example, is readily soluble in alcohol and the phenates may be dissolved in such remover solvents. Other desirable palliatives are alkaline starch formed, for example, by stirring starch into a strong solution of caustic soda to form a thick pasty mass which may be combined with acid bodies of this character in removers, starch and ammonia mixtures having a similar action.

In such removers it is desirable to use in addition to such phenolic and palliative material suitable finish solvent material preferably of a composite or mixed character, for example, comprising loosening and penetrating finish solvent material. Among the loosening finish solvents, that is, solvents having a generally alcoholic character or action in removers are the true alcohols, such as methyl ethyl, propyl, butyl, amyl, benzyl and the like, preferably in their commercial forms, including denatured alcohol and also other loosening solvents having generally alcoholic action in removers, such as the various ketonic solvents, including acetone, methyl acetone, methyl-ethyl ketone, oil of acetone, as well as aldehydes and esters of various kinds. Among the penetrating finish solvent material, that is, finish solvents having a generally benzolic character or action in removers are included benzol and its homologues and the somewhat corresponding petroleum solvents, such as gasolene, carbon-bisulfid, carbon-tetrachlorid, acetylene-tetrachlorid and other chlorinated solvent compounds, turpentine, wood turpentine and the like. Although not necessary in all cases, various stiffening materials, such as wood flour, starch, whiting, fullers' earth, magnesia, infusorial earth may be used, and also waxy, soapy or gelatinous stiffening material including paraffin, ceresin, ozocerite, beeswax, etc., it being, of course, understood that all the ingredients are preferably thoroughly incorporated by agitation at the desired slight rise of temperature.

An illustrative remover of this character may comprise carbolic acid 20 gallons, benzol 13 gallons, denatured or wood alcohol 20 gallons, wood flour 10 pounds and ceresin wax 5 pounds with which two to six pounds of finely ground sodium hydrate may be incorporated.

Another illustrative remover may comprise carbolic acid 25 gallons, benzol 25 gallons, wood alcohol 20 gallons, ceresin wax 4 pounds, to which may be added 50 pounds of light oxid of magnesia.

Another illustrative remover may comprise methyl acetone 20 gallons in which 8 pounds of potassium phenate have been dissolved, 15 gallons of benzol, 4 gallons of pine oil and 10 pounds of incorporated ceresin wax.

Another non-inflammable remover of this character giving good results on varnish finishes, may be produced by incorporating 60 parts of a forty per cent. aqueous solution of potassium cresylate with 15 parts of solvent naphtha containing 3 parts of dissolved paraffin, 10 parts of pine oil, 25 parts of benzyl alcohol and 3 parts of turkey red oil or concentrated sulfonated castor oil.

Another remover may comprise 10 parts of benzol containing one part of dissolved ceresin, 10 parts of cresylic acid, 3 parts of chlorcresol, 3 or 4 parts of a fifty per cent. water solution of caustic potash and sufficient water to make 30 parts.

Another remover may comprise 20 parts of benzol containing one part of dissolved paraffin, 20 parts of cresylic acid, 6 parts of a fifty per cent. water solution of caustic potash and sufficient water to make 60 parts.

The invention in this application which contains subject-matter taken from the Ellis applications, Serial No. 364,749, filed March 27, 1907 and 598,389, filed December 20, 1910, has been described in connection with a number of illustrative ingredients, formulas, proportions and processes, to the details of which disclosure the invention is not of course to be limited.

What is claimed is:

1. The finish remover formed approximately from 20 gallons of carbolic acid, 13 gallons of benzol, 20 gallons of denatured alcohol, 10 pounds of wood flour, 5 pounds of ceresin wax and 2 to 6 pounds of finely ground sodium hydrate combining with the phenolic material to form alkali phenate.

2. The finish remover formed approximately from 20 gallons of carbolic acid, 13 gallons of aromatic penetrating solvent material, 20 gallons of alcohol, stiffening material comprising mineral wax and incorporated caustic alkali combining with the phenolic material.

3. The finish remover formed approximately from 20 gallons of phenol, 33 gallons miscible loosening and penetrating finish solvents, stiffening material including wax and incorporated caustic alkali capable of combining with the phenolic material to mitigate or neutralize its corrosive properties without destroying the finish loosening action thereof.

4. The substantially non-aqueous finish remover comprising phenolic finish loosening material, penetrating and loosening finish solvent material, stiffening material including wax and alkali palliative material capable of combining with said phenolic material and mitigating or neutralizing its corrosive action without destroying the finish loosening action thereof.

5. The substantially non-aqueous finish remover consisting largely of volatile composite penetrating and loosening finish solvent material, miscible phenolic finish loosening material, incorporated dissolved alkali phenate and incorporated waxy stiffening material.

6. The substantially non-aqueous finish remover consisting largely of composite organic volatile finish solvent material, miscible phenolic finish loosening material incorporated therewith and incorporated caustic alkali palliative material capable of combining with said phenolic material and mitigating or neutralizing its corrosive action without destroying the finish loosening action thereof.

CARLETON ELLIS.

Witnesses:
BIRDELLA M. ELLIS,
JOHN H. DERBY, Jr.